March 25, 1969   G. R. LANMAN   3,434,714
TEETER-TOTTER WITH ADJUSTABLE BRAKE MEANS
Filed April 21, 1965                            Sheet 1 of 2

INVENTOR.
GUY RILEY LANMAN
BY
Victor J. Evans & Co.
Attorneys

INVENTOR.
GUY RILEY LANMAN
BY
Victor J. Evans & Co.
Attorneys

United States Patent Office 3,434,714
Patented Mar. 25, 1969

3,434,714
TEETER-TOTTER WITH ADJUSTABLE BRAKE MEANS
Guy Riley Lanman, P.O. Box 97, El Reno, Okla. 73036
Filed Apr. 21, 1965, Ser. No. 449,725
Int. Cl. A63g 11/00
U.S. Cl. 272—54          4 Claims

ABSTRACT OF THE DISCLOSURE

Adjustable brake mechanism for a teeter-totter. The teeter-totter board is mounted on a bearing board which is in turn mounted for rotation about a fixed axis. At each end of the bearing board is a fulcrum bar which is axially adjustable along the bearing. Surrounding the axis is a brake band with sockets in its ends. Depending from the center of the teeter-totter board is a bolt supporting a pair of interconnected lift blocks, each pivotable about a point on either side of the axis and projections engaging the brake band sockets. When the teeter-totter board pivots about either of the adjustable fulcrum bars it pulls up on the bolt which causes the lift blocks to pivot and in turn tighten the brake band about the axis, thereby causing the teeter-totter board to slow its motion.

---

The present invention relates to an improved and adjustable brake mechanism for a teeter-totter board, and more particularly relates to a novel apparatus having a minimum number of working parts for providing a brake action in a teeter-totter board at the ends of its movement about an axis. The invention is an improvement over and generally relates to what is shown in my Patents Nos. 2,236,409; 2,415,639; and 2,970,837.

An object of the present invention is to provide an activating or lifting block for a teeter-totter board for allowing substantial leverage in applying a great amount of power in a very small amount of space and having few working parts.

Another feature of the invention is to provide a brake for decelerating the arcuate movement of the teeter-totter board about its axis during the terminal portion of the movement thereof.

Another feature of the invention is to provide fulcrum bars on top of and upon the main bearing bars for providing a brake action that is very simple in operation, quick acting and positive in character.

A further feature of the invention is to increase the stopping power of a brake, and in which the fulcrum bars merely are moved toward the center, and for decreasing the braking power as they are moved outwardly.

Another feature of the invention is to provide rubber-coated fulcrum bars that are easy to stop the teeter-totter by persons such as small children.

An additional object of the invention is to provide a bumper of rubber or other resilient material located in the center of an equipment board having a recess therein, and for use to pry the equipment board over the fulcrum so that the bumper absorbs the thrust.

A further object of the invention is to provide a bumper having the unique operation in the system of the invention for first stopping the equipment board while in its terminal movement path, and then letting the board move down more slowly in the same general direction so that the bumper relieves a great amount of strain on the equipment.

These as well as further advantages which are inherent in the invention will become apparent from the following description, reference being had to the accompanying drawings wherein.

Figure 1:
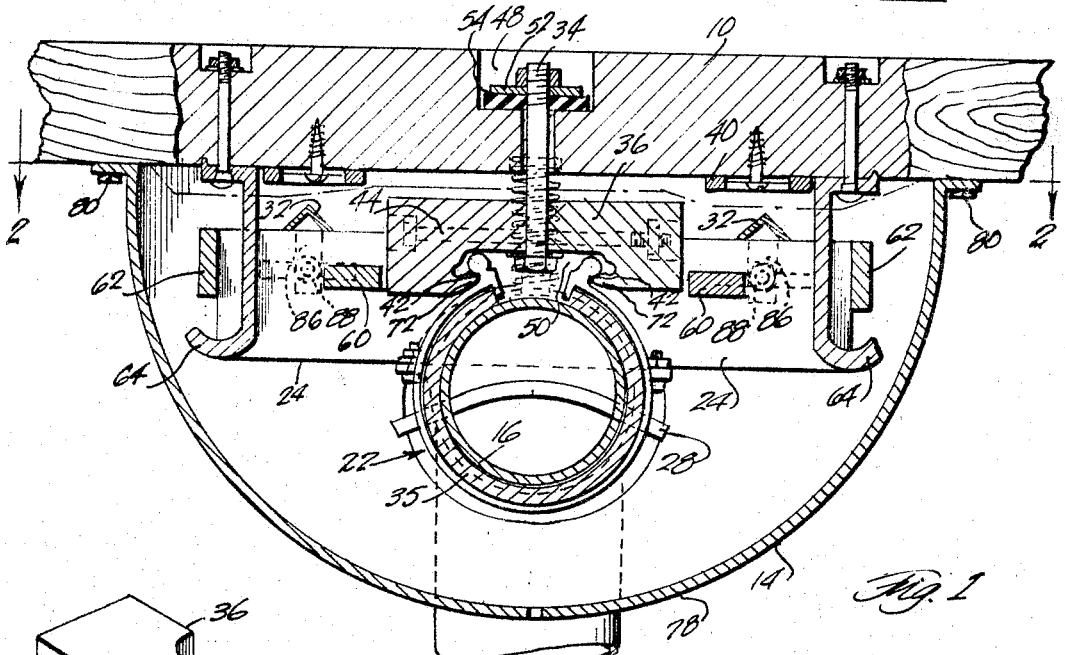
FIGURE 1 is a broken away cross-sectional elevational view of the adjustable brake for a teeter-totter in accordance with a preferred embodiment of the present invention.

Referring now to the drawings, there is shown a beam 10 of a teeter board, on which is a player board 12, and the teeter board 10 being supported by the apparatus including the brake mechanism in a housing 14 supported by an axle 16. The axle 16 is the tube or pipe over which a main bearing 18 rides with an enlarged portion 20. A brake band and lining arrangement 22 is comprised of a steel band lined with brake lining or other brake friction material that works over the main axle 16 and is covered by the main bearing 18 to which is secured four bars 24 of the main bearing. Extending from the main bearing in the form of a saddle near the place of the enlarged portion 20 are flanges 26 which contact a positive stop 28, and these are projections which extend from the axle 16 at each side thereof for stopping the travel of the bearing 18 so that the end of the board 12 does not hit the ground in normal use and where the ground surrounding the adjustable brake teeter-totter board is generally flat throughout.

These adjustable fulcrum bars 32, 32 work upon the top of the main bearing bars 24, 24 and are secured with adjustable connections (not shown) in a well-known manner for allowing them to be shifted to adjust the braking power of the brake band and lining arrangement. The greater the pressure that is applied to the brake arrangement 22, the more that it will hold. As the equipment board rocks over the fulcrum bars 32, 32, a main lift bolt 34 lifts a brake activating or lifting block 36 and applies force to the brake arrangement 22. The fulcrum bars 32 contact a wear plate 40 when they are being pushed against the bottom of the equipment board.

Figure 5:
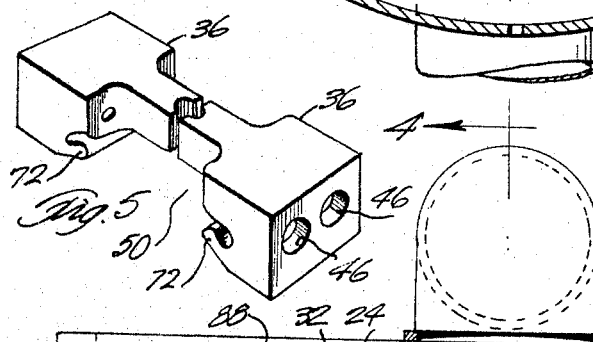
FIGURE 5 is a perspective view of a braking lift block for activating the brake mechanism in accordance with a preferred embodiment of the present invention.

The brake activating or lifting block 36 closes the brake band 35 of the arrangement 22 when upward pull is exerted by the bolt 34 so that these blocks are constantly in contact with the brake band sockets 42 and are held in place by them. These blocks 36 are held in proper alignment by fulcrum bolts 44 which are inserted in fulcrum bolt openings 46, 46, shown in FIGURE 5. The heads of the bolts 44 serve as a fulcrum when lifting pull is exerted on one end of the board 12. The fulcrum bolts 44 hold the activating or lifting block 36 in working position so that when pull is exerted, these bolts prevent the block from spreading apart.

The main lift bolt 34 has the head end thereof positioned in a recess 48 in the equipment board 10, and the lever end of the activating block also contains a recess 50 and lifts the lifting blocks 36, 36 by a plate or steel washer 52 in recess 48. In addition to the plate or steel washer 52, there may be a resilient washer 54 that rests in the recess 48 of the equipment board and under the steel washer 52 for the purpose of absorbing some of the shock of the positive stop 28, and thus provide a damped effect upon the stop of the teeter-totter board. The wear plates 40, 40 are placed on the bottom side of the equipment board substantially directly over the fulcrum bars 32, 32, respectively, and they provide means for keeping the fulcrum bars from wearing the equipment board 10.

Bumper plates 60, 60 are welded between the bars 24, 24 in the main bearing for the ends of the lift blocks 36, 36 to hit against when the main bearing stops after the brake has been applied to the axle 16. On the ends of the main bearing 24 are mean bearing crossbars 62, as shown in FIGURE 1, that make up the bearing frame. Also as shown in FIGURES 1, 2, 3 and 4, there are jay bars or hooks 64 that ride freely against the crossbar 62 and between the two centrally positioned main bearing bars 24 for guiding the up-and-down motion of the board 10. The hooks of the jay bar 64 are turned outwardly to engage the crossbar 62 for preventing the board 10 from being pulled entirely off the bearing should the main lift bolt 34 or any other part thereof happen to break or otherwise deteriorate and fracture.

Figure 4:
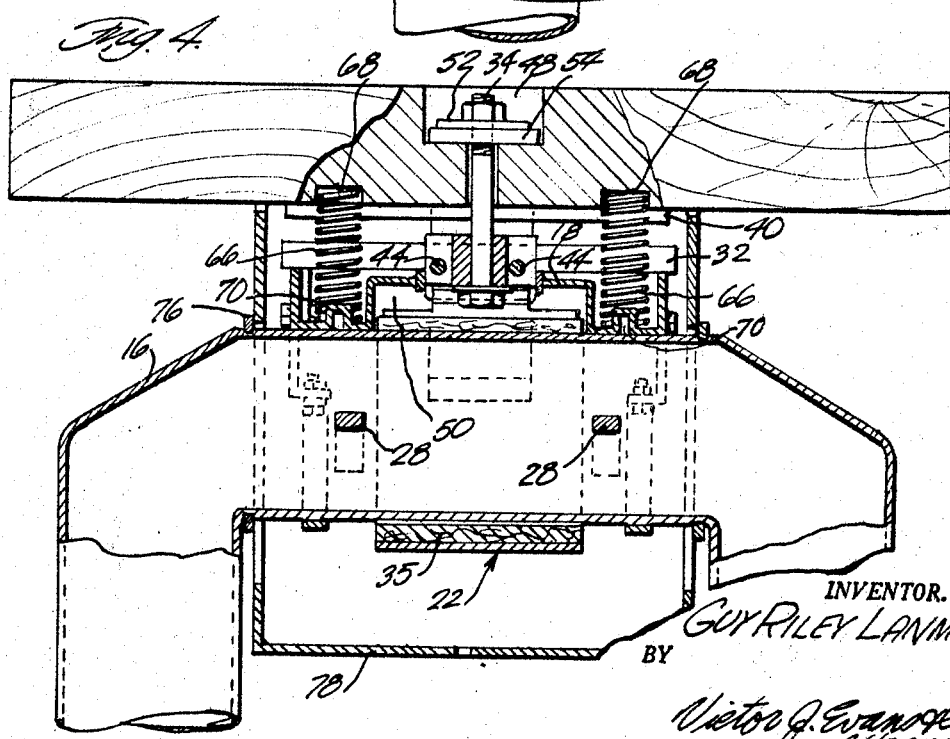
FIGURE 4 is a side elevational view taken along lines 4—4 of FIGURE 2, showing the operation of the teeter-totter in one position.

As shown in FIGURE 4, there is a pair of springs 66 positioned on top of the end of the main part of the bearing for causing the open or empty end of the board to rise sufficiently so the brake will start to apply. The springs 66 work in sockets 68 on the bottom side of the equipment board 10 and over-guide members 70, 70 that are made integral parts of the saddle of the main bearing 18.

As has been described above in connection with the descriptions of FIGURES 1 and 3, there is shown the brake band sockets 42, 42 shaped to make a socket-receiving portion for the activating block ear 72 to work in. The socket 42 is carefully formed and positioned to fit and to keep pulling as it is pushed up and in toward the center by the lifting block ear 72. This swinging or pushing effect is achieved in the upward and inward direction as the bolt 34 lifts the lever end of the activating block 36 to produce a system of leverage ample in magnitude to activate the brake arrangement 22.

A large split washer 76 is provided to fit snugly over and around the axle 16 exterior of a housing 78. The housing 78 is a shield for all of the essential components of the brake and brake band arrangement 22, and is made of tin or other material sufficiently strong to protect the players from the moving and operating parts thereof. The housing 78 is fastened to the bottom of the equipment board by well-known means 80.

Figure 3:
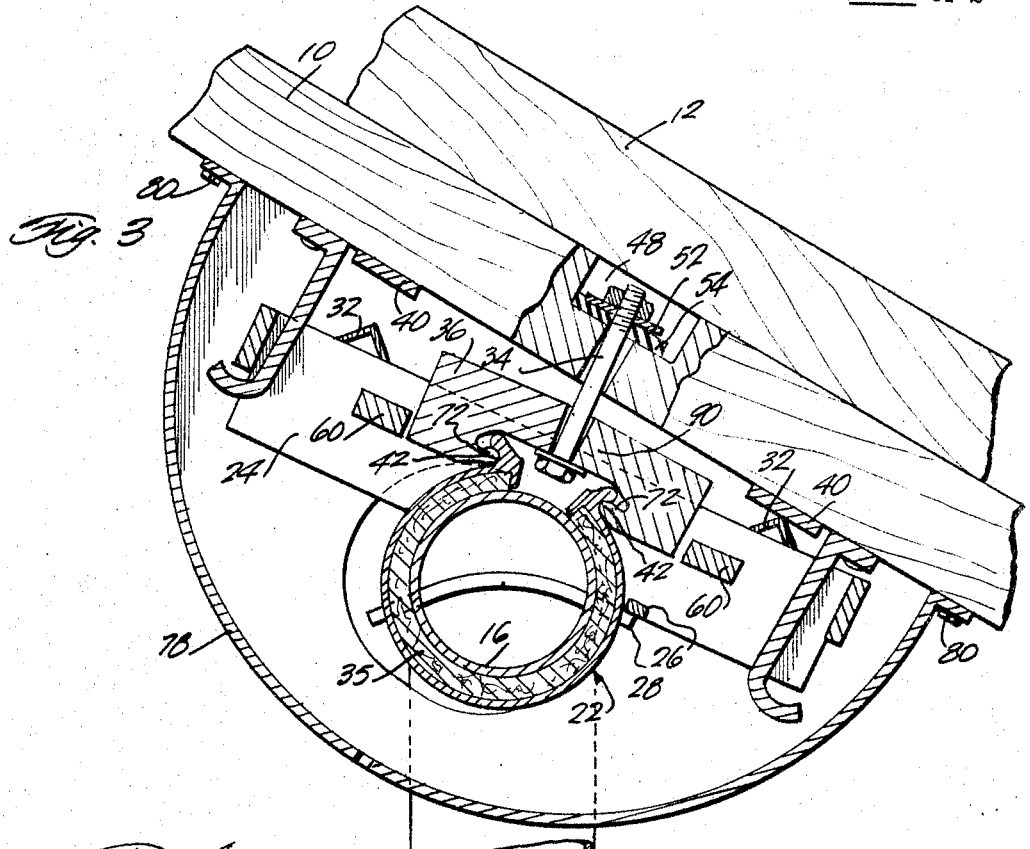
FIGURE 3 shows a cross-sectional elevational view of the adjustable brake mechanism for a teeter-totter in a tilt position.

In order to adjust the fulcrum adjusting bars 32 about their positions, there are provided adjusting plates 86, 86 operable by adjusting bolts 88, 88, 88, 88. The adjusting plates are bent downwardly so as to work on the inside of the outside of the main bearing 18. It is noted that the inside head of the lifting bolt 34 may be adjusted also for lifting the lever end 90 of the activating blocks, as shown in FIGURE 3, of the projecting portion of the activating block, 36, 36. The lever arm 90 of the activating block is a portion of the activating block 36 which comes in contact with the lifting bolt 34 and acts as a lever in operating the brake.

Figure 2:
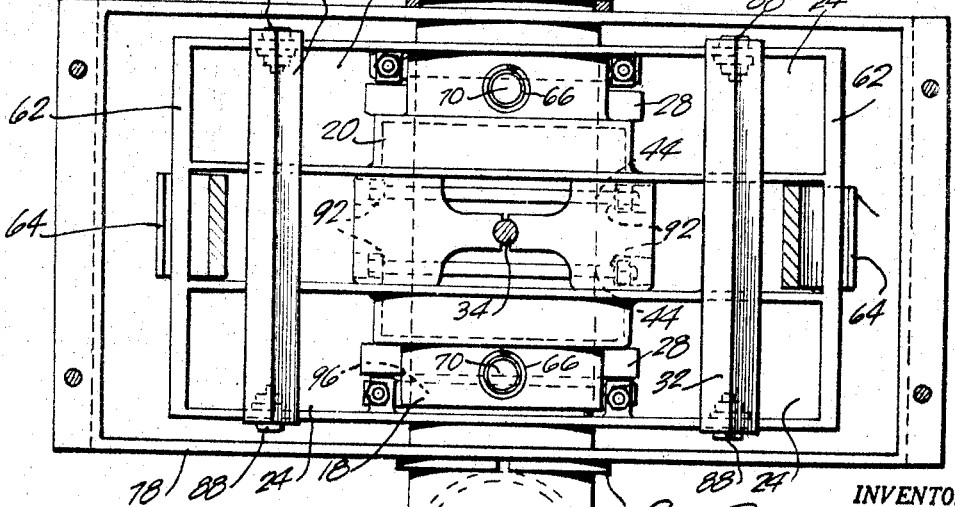
FIGURE 2 is a cross-sectional plan view taken along lines 2—2 of FIGURE 1, showing the essential components of the adjustable brake.

The shoulder 92, 92 of the fulcrum bolt 44, as shown in FIGURE 2, comes in contact with the outer part of the activating block 36, 36, and becomes the point of fulcrum for the brake action in the brake activating and lifting block arrangement 36.

As has been partially described above, the recess 48 in the center of the equipment board 10 is drilled only part way through, and the recess retains the resilient washer 54 and the steel washer 52, and it is through this action of elements that the lift bolt 34 passes in applying the force of the brake. The bearing caps 96, shown in FIGURE 2, are on the underside of the axle 16 and bolt to the main bearing 18 for holding the main bearing to the axle and guiding its movement thereon.

In the operation of the adjustable brake teeter-totter board, if one player or the weight should suddenly fall off of the board, the two springs 66 exert sufficient force and enough energy to lift the empty end of the board sufficiently to start the brake 22 to take hold, and the continued weight of the player will apply the brake to full capacity for stopping the player. If one player should fall off of the board the fulcrum point will change from the axle 16 to the fulcrum bar 32, and causing the equipment board 10 to tilt and the wear plate 40 on the bottom of the beam to rock over the fulcrum bar 32 which is on top of the main bearing bars 24 as the center of the beam starts to rise. This causes the lift bolt 34 and the resilient washer 54 in the bottom of the recess 48 to start moving in an upward direction, and in so doing the head of the bolt 34 starts to lift the lever ends of the activating block 36.

The lifting block 36 and the two bolts 44, 44 (92, 92) make up a full floating lifting unit. The two lift blocks are held together by the two bolts 44 which pass through enlarged holes 46 in the block 36. When the lever ends of the block 36 start upwardly, this causes the lifting block ear 72 to continue to lift upwardly and inwardly on the brake band sockets 42 to start closing the brake. Thus the inside of the head of the lift bolt 34 lifting the lever ends of the block 36 works against the inside of the fulcrum bolt heads 92 to make up the closing action. As the bolt 34 continues to lift the lever ends of the block 36, the lifting block ears 72 continue to lift upwardly on the brake band sockets 42 until it completely applies the brake, wherein one end of the board 12 approaches the ground. As the end of the board 12 approaches the ground, the brake is fully applied and has become locked on the axle 16 so that the main bearing 18 and the bumper plate 60 press against the outside of the lift block 36 in line with the lift block ear 72 to thereby stop the travel of the main bearing and consequently stop the player on the board. Thus the player has been stopped gently, and the amount of the brake power desired is controlled by the position of the fulcrum bars 32 on top of the main bearing bars 24. As the fulcrum bars are moved toward the center, the amount of the braking power increases, but to move them outwardly it decreases the power of the brake.

Additional embodiments of the invention in this specification will occur to others, and therefore it is intended that the scope of the invention be limited only by the appended claims and not by the embodiments described hereinabove. Accordingly, reference should be made to the following claims in determining the full scope of the invention.

What is claimed is:

1. An adjustable brake mechanism for a teeter-totter board comprising an axle for supporting a teeter-totter board, a brake mechanism mounting on a main bearing supporting the teeter-totter board and engaging said axle, a positive stop means positioned upon said axle, main bearing bars on said main bearing, means associated with said main bearing bars co-acting with said positive stop means to limit the pivoting of the main bearing and main bearing bars, lift block means engaging said brake mechanism for actuation of the brake mechanism upon attainment of a predetermined inclined position by said teeter-totter board, spring means mounted between said board and said main bearing bars to cause said board to attain said predetermined position, and including a lift bolt mounted upon said teeter-totter board and coupled to said lift block means and adjustable fulcrum means mounted on said main bearing bars for and adjacent to each end thereof engagement with said board for varying the leverage capability of said board.

2. An adjustable brake mechanism for a teeter-totter comprising an axle for supporting a teeter-totter board, a brake mechanism including a brake band having sockets and mounted on a main bearing in engagement to stop displacement thereof with reference to the axle when the sockets are displaced with respect to each other, lift block means having ears for cooperation with said sockets of said brake bands, adjustable fulcrum means in said main bearing, a lift bolt mechanism actuable by any displacement of said board about said fulcrum means to actuate the lift block means for terminating displacement of the axle with respect to said board when said board has been sufficiently displaced to a prdetermined position, said lift block means being secured to said board by said lift bolt mechanism, and a resilient washer being interposed between said board and the bolt to absorb severe shock to the working mechanism and to provide a smoother action in stopping the board.

3. An adjustable brake mechanism for a teeter-totter comprising an axle, a brake mechanism comprising a brake band, having sockets, in engagement with said axle, bearing bars mounted for supporting the teeter-totter board upon said axle and including adjustable fulcrum bar means, a main bearing, lifting blocks for engaging said brake mechanism, said lift blocks having ears for cooperating with said brake band sockets in stopping the movement of the teeter-totter board, and a lift bolt supportably mounted on said teeter-totter board and coupled to said lift block for exerting a force by said lift blocks when said board fulcrums to a predetermined inclined position about said fulcrum means for actuating the brake mechanism for stopping the teeter-totter board prior to its impact against the ground.

4. The invention according to claim 3 wherein a resilient washer is interposed between the board and the bolt to aid the action of stopping the board.

References Cited

UNITED STATES PATENTS 2,043,894  6/1936  Husted _____ 272—54
2,970,837  2/1961  Lanman _____ 272—54

RICHARD C. PINKHAM, *Primary Examiner.*
PAUL E. SHAPIRO, *Assistant Examiner.*

U.S. Cl. X.R.

272—55